Jan. 5, 1932.  C. A. KUEBLER ET AL  1,839,231
ROD WIPER
Filed Sept. 5, 1928
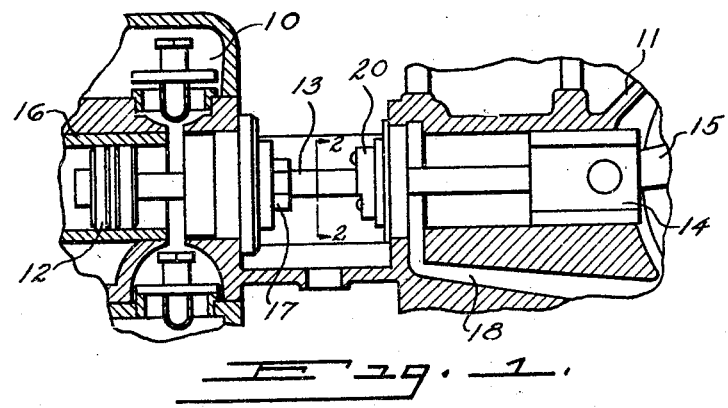
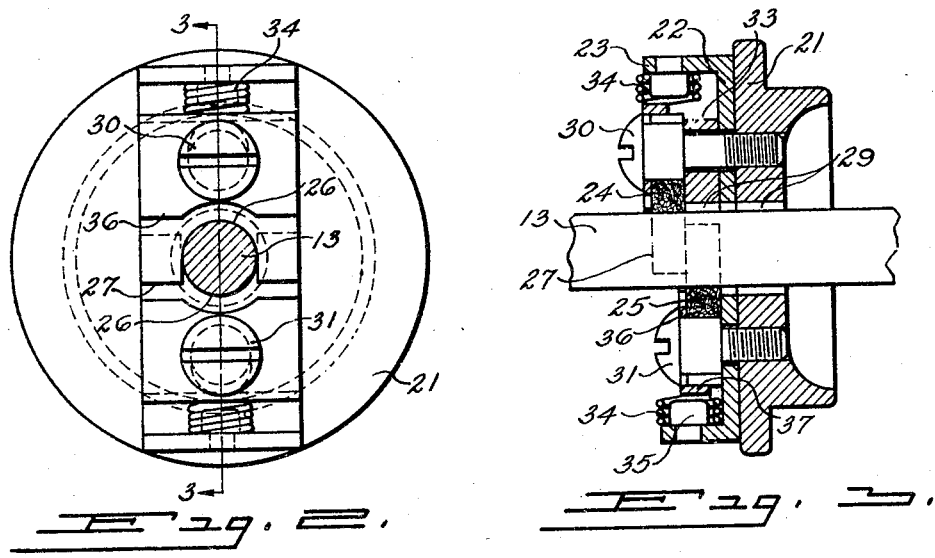
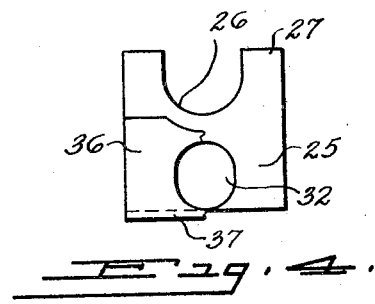
INVENTOR
C. A. Kuebler +
M. A. Martin
BY Marechal & Noe
ATTORNEYS Patented Jan. 5, 1932

1,839,231

UNITED STATES PATENT OFFICE

CHESTER A. KUEBLER AND MICHAEL A. MARTIN, OF ERIE, PENNSYLVANIA, ASSIGNORS TO UNIFLOW MANUFACTURING COMPANY, OF ERIE, PENNSYLVANIA, A CORPORATION OF PENNSYLVANIA

ROD WIPER

Application filed September 5, 1928. Serial No. 304,142.

This invention relates to piston rod wipers of the type designed to prevent the travel of moisture along a pump rod, and is particularly applicable to piston rods which interconnect a pump cylinder and an engine cross head to prevent the passage of moisture from the pump cylinder to the cross head housing.

One object of the invention is the provision of a wiper of this character having means to automatically compensate for wear of the wiping material.

Another object of the invention is the provision of a wiper having a plurality of wiping sections which are mounted on a fixed supporting member for movement toward the piston rod, the sections engaging opposite sides of the piston rod so that the piston rod is always entirely enclosed by the wiper sections.

Further objects and advantages of the invention will be apparent from the following description and the accompanying drawings, in which,—

Fig. 1 is a vertical sectional view of a pump system embodying the present invention;

Fig. 2 is a vertical section on the line 2—2 of Fig. 1, showing the rod wiper assembly;

Fig. 3 is a section on the line 3—3 of Fig. 2, through the rod wiper assembly; and Fig. 4 is a detail view of one of the rod wiper sections.

In the drawings, in which corresponding numbers designate like parts in the various views, the invention is shown as applied to a water pump system embodying a water pump 10 which is operated by an engine 11, the water pump having a piston 12 which is connected by a piston rod 13 to the engine cross head 14 operated in turn by the crank 15 of the engine. The piston rod 13, where the latter extends through the end of the cylinder 16 of the pump, preferably extends through a suitable stuffing box 17, but such stuffing boxes do not absolutely prevent the leakage of fluid, and in order to prevent the passage of moisture along the piston rod to the cross head housing 18 of the engine, and to prevent the travel of oil and oil vapor from the crankcase housing, a piston rod wiper designated generally 20 is provided to effectively wipe liquid from the piston rod and prevent the passage of moisture from the pump side of the piston rod to the engine crankcase.

The piston rod wiper 20 is preferably attached to the engine crankcase 18, a suitable plug 21 being fastened in any desired manner to the end of the crankcase housing, as shown, which provides a support on which the various parts are held. To this plug 21 is fastened a supporting means 22 in the form of a metal plate, bent outwardly at its opposite ends as shown at 23. This supporting means holds a plurality of rod wiper sections, two oppositely positioned sections 24 and 25 being shown. These sections are of leather or other similar somewhat soft and yielding material, and each has a semicircular depression 26 in frictional contact with half of the piston rod. The ends 27 of these wiper sections extend beyond the center of the piston rod as shown in Figs. 2 and 3, and are offset in the direction of the piston rod axis so that the piston rods are entirely encircled by the two wiper sections, and moisture or other liquid is very effectively wiped off of the piston rod as the latter reciprocates back and forth within the rod wiper assembly. Free movement of the piston rod within the plug 21 and the plate 22 is permitted since the central openings 29 in these parts are slightly larger than the piston rod diameter so that they are not in frictional contact with the rod, thus minimizing friction of the moving parts.

The wiper sections 24 and 25 are mounted on the supporting means or plate 22 by means of screws 30 and 31, the ends of which are threaded in the plug 21, these screws extending through slotted openings 32 in the wiper sections. The screws 30 and 31 are shouldered, screw 30 engaging a spacer block 33 while screw 31 engages the supporting plate 22, thus holding the spacer block 33 and the supporting plate 22 in fixed position with relation to the plug 21, the screw shoulders being of sufficient size and length, however, as to permit free movement of the wiper sections toward the piston rod axis, while maintaining the wiper sections fixed against movement in the direction of the piston rod axis. The wiper sections 24 and 25 are yieldingly urged toward the piston rod, to compensate for wear of these sections, such means being shown in the form of springs 34 between the outer ends of the wiper sections and the outwardly bent ends 23 of the supporting plate. These springs may be held positioned with relation to the supporting plate by means of small studs 35 extending inwardly from the out-turned ends 23. A metal washer 36 is preferably provided between the head of each screw and the wiper sections, these washers each having a down-turned side 37 which extends along and braces the inner side of the wiper section and forms a pressure plate for the end of the spring 34. These washers are slotted correspondingly to the openings 32 of the wiper sections to permit movement of the washers with the wiper sections relative to the holding screws 30 and 31, as wear is compensated for.

It will thus be apparent that the wiper sections are always engaged effectively with the piston rod throughout its entire circumferential extent, and leakage of moisture along the piston rod is always prevented, wear of the wiper sections being automatically compensated for so that the device is effective in an efficient manner throughout long periods of time.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A wiper of the class described for reciprocating piston rods, comprising a supporting plate having an opening through which the piston rod extends, and a pair of wiper sections movably mounted on said supporting plate for motion toward the piston rod and offset in the direction of the piston rod axis, means for guiding said sections on said supporting plate, and spring means for moving said sections toward the piston rod.

2. A piston rod wiper comprising a pair of adjacent rod wiper sections each in frictional engagement with half of the piston rod, said sections having overlapping end portions, supporting means for holding said wiper sections having an opening through which the piston rod extends, means extending transversely through said sections and connecting them to the supporting means for movement towards the piston rod, and yielding means for adjusting said wiper sections on said supporting means to compensate for wear.

3. A piston rod wiper of the class described comprising a supporting plate having a central hole through which a piston rod is adapted to freely extend and having out-turned end portions, a pair of wiper sections each frictionally engaging opposite sides of the piston rod and having overlapping end portions, slots in said wiper sections, bolts held in said plate and extending through the slots in said wiper sections, and springs between the ends of the wiper sections and the out-turned end portions of said plate.

In testimony whereof we hereto affix our signatures.

CHESTER A. KUEBLER.
MICHAEL A. MARTIN.